United States Patent
Maimone et al.

(10) Patent No.: US 7,470,215 B2
(45) Date of Patent: Dec. 30, 2008

(54) VEHICLE DRIVETRAIN WITH SECONDARY CLUTCH

(75) Inventors: Bud Maimone, Poland, OH (US); Alexis Uspenski, Rock Creek, OH (US)

(73) Assignee: Cobra Motorcycle Mfg., Inc., Hillsdale, MI (US)

( * ) Notice: Subject to any disclaimer, the term of this patent is extended or adjusted under 35 U.S.C. 154(b) by 340 days.

(21) Appl. No.: 11/392,139

(22) Filed: Mar. 29, 2006

(65) Prior Publication Data

US 2007/0232447 A1 Oct. 4, 2007

(51) Int. Cl.
*B60W 10/02* (2006.01)

(52) U.S. Cl. .......................... 477/175; 477/74; 477/84; 477/91

(58) Field of Classification Search .................. 477/74, 477/77, 83, 89, 91, 166, 174, 175
See application file for complete search history.

(56) References Cited

U.S. PATENT DOCUMENTS 6,533,056 B1  3/2003  Maimone
6,887,183 B2 *  5/2005  Murasugi .................... 477/143
7,356,400 B2 *  4/2008  Honma et al. ................. 701/67

FOREIGN PATENT DOCUMENTS

JP  2000-110929  *  4/2000
JP  2001-227634  *  8/2001

* cited by examiner

*Primary Examiner*—Ha D. Ho
(74) *Attorney, Agent, or Firm*—Knobbe Martens Olson & Bear, LLP (57) ABSTRACT

A drivetrain including a primary clutch and a secondary clutch is well-suited for use in a single-speed vehicle. The primary clutch may be automatically-engaging or manually-engaging. The secondary clutch, preferably, is normally engaged and is configured to disengage, or slip, at a threshold torque level. Desirably, the slip torque level of the secondary clutch is configured to be greater than the peak engine torque of the vehicle such that disengagement of the secondary clutch due to engine-supplied torque does not occur. In some arrangements, the slip torque level may be significantly higher than the maximum engine torque,

11 Claims, 8 Drawing Sheets

VEHICLE DRIVETRAIN WITH SECONDARY CLUTCH

BACKGROUND OF THE INVENTION

1. Field of the Invention

The present invention relates generally to a drivetrain for a vehicle. More particularly, the present invention relates to a vehicle drivetrain having a secondary clutch configured to interrupt transmission of torque through the drivetrain in response to torque loads above a threshold level that are applied to the drivetrain.

2. Description of the Related Art

In general, vehicles intended for off-road use employ a manually operated multi-speed transmission, which typically utilizes a manually controlled clutch assembly configured to interrupt the flow of torque through the vehicle's drivetrain. Such an arrangement provides the operator of the vehicle with direct control over the gear ratio selected for a particular situation. Conversely, off-road vehicles intended for younger, less experienced riders often utilize an automatically engaging clutch and single speed transmission.

Eliminating the need to shift gears and control engagement of a manual clutch reduces learning time for a younger, inexperienced rider. An automatically engaging clutch also allows the less experienced rider to fully concentrate on maneuvering the vehicle, rather than focusing on transmission gear selection and clutch operation. Furthermore, in certain competitive events for off-road vehicle (e.g., motocross or cross-country races), riders in certain age groups and/or displacement categories are required to compete aboard a single speed vehicle, which may also be equipped with an automatically engaging clutch.

A common automatically-engaging clutch is actuated by the engine speed of the vehicle. Such clutch mechanisms are often referred to as a centrifugal clutch. In such an arrangement, the clutch assembly is disengaged at engine speeds below a threshold engine speed, or an engagement speed. Once the engine reaches the engagement speed, the automatic clutch engages to transmit torque from the engine of the vehicle to the transmission of the vehicle, which drives one or more driven wheels of the vehicle.

Although an automatically-engaging clutch is advantageous in that it automatically engages and disengages the vehicle engine from the vehicle transmission without direct operator involvement, such an arrangement also suffers from disadvantages. For example, because the engagement force of the automatic clutch generally depends upon the engine speed, the clutch is unlikely to slip (permit relative movement between various components of the clutch) when engine speeds are high. As a result, sudden decelerations of the driven wheel(s) of the vehicle, when the engine speed is high, results in a large torque spike being transmitted through the vehicle drivetrain because the automatic clutch tends to remained engaged.

Such a situation is common when an off-road vehicle contacts the ground upon landing from a jump. Typically when landing from certain jumps, especially when the landing is on relatively flat ground, the vehicle operator will keep the engine speed high to ease the jolt of the landing and maintain momentum upon landing. As a result of high-torque loads, which may be significantly higher than the torque loads experienced during normal operation, certain transmission and engine components are typically over-built to withstand such loading characteristics. That is, the drivetrain is typically designed to accommodate loads that are relatively infrequent and often of short duration and which exceed the loads experienced the majority of the time during "normal" operation. As a result, such a drivetrain possesses an undesirable amount of inherent friction, and thus inefficiency, for most operating conditions.

SUMMARY OF THE INVENTION

Preferred embodiments of the present vehicle drivetrain employ a secondary clutch, in addition to a primary clutch. The primary clutch may be automatically-engaging or manually-engaging. The secondary clutch, preferably, is normally engaged and is configured to disengage, or slip, at a threshold torque level. Desirably, the slip torque level of the secondary clutch is configured to be greater than the peak engine torque of the vehicle such that disengagement of the secondary clutch due to engine-supplied torque does not occur. In some arrangements, the slip torque level may be significantly higher than the maximum engine torque, such as one and one-half to two times higher, for example. Desirably, however, the slip torque level is lower than a torque level that would damage drivetrain components.

A preferred embodiment is a single speed off-road vehicle including an engine and at least one driven wheel. A transmission is configured to selectively transfer torque from the engine to the driven wheel at a constant ratio. The transmission includes a first clutch driven by the engine and configured to automatically engage at engine speeds above a threshold engine speed, such that torque is transmitted through the first clutch. The transmission also includes a second clutch configured to be normally engaged, such that torque is passed through the second clutch and further configured to disengage when a torque is applied to the second clutch that is above a threshold slip torque level.

Another preferred embodiment is a slip clutch for a single-speed off-road vehicle. The slip clutch includes a drive plate configured to be driven by torque produced from an engine of the vehicle and transmitted through a first clutch. The slip clutch also includes a first pressure plate, a second pressure plate, and a hub configured to output torque to a driven wheel of the vehicle. The first pressure plate and the second pressure plate are coupled for rotation with the hub. A biasing member is configured to apply a biasing force to the slip clutch, such that the drive plate, the first pressure plate and the second pressure plate are engaged to rotate together and transmit a torque input from the drive plate to the hub through the first and second pressure plates. The slip clutch is configured such that relative movement between the drive plate and the first and second pressure plates is permitted in response to a torque applied to the slip clutch that exceeds a predetermined value.

Still another preferred embodiment is a single speed off-road vehicle including an engine and at least one driven wheel. A transmission is configured to selectively transfer torque from the engine to the driven wheel at a constant ratio. The transmission includes a first clutch driven by the engine and configured to automatically engage at engine speeds above a threshold engine speed, such that torque is transmitted through the first clutch. Further, the transmission includes means for operably disengaging the engine from the driven wheel in response to a torque input to said transmission above a threshold slip torque level.

BRIEF DESCRIPTION OF THE DRAWINGS

These and other features, aspects and advantages of the present vehicle drivetrain are described below with reference to drawings of a preferred embodiment, which is intended to illustrate, but not to limit, the present invention. The drawings contain seven figures.

FIG. 2 illustrates certain components of the present drivetrain, including a primary clutch and a secondary clutch.

FIGS. 4A and 4B illustrate a gear of the secondary clutch of FIG. 2.

As illustrated in FIG. 2, preferably, two pressure plates are utilized in the secondary clutch assembly.

FIGS. 6A-6C illustrate a hub of the secondary clutch assembly of FIG. 2.

DETAILED DESCRIPTION OF THE PREFERRED EMBODIMENT

Figure 1:
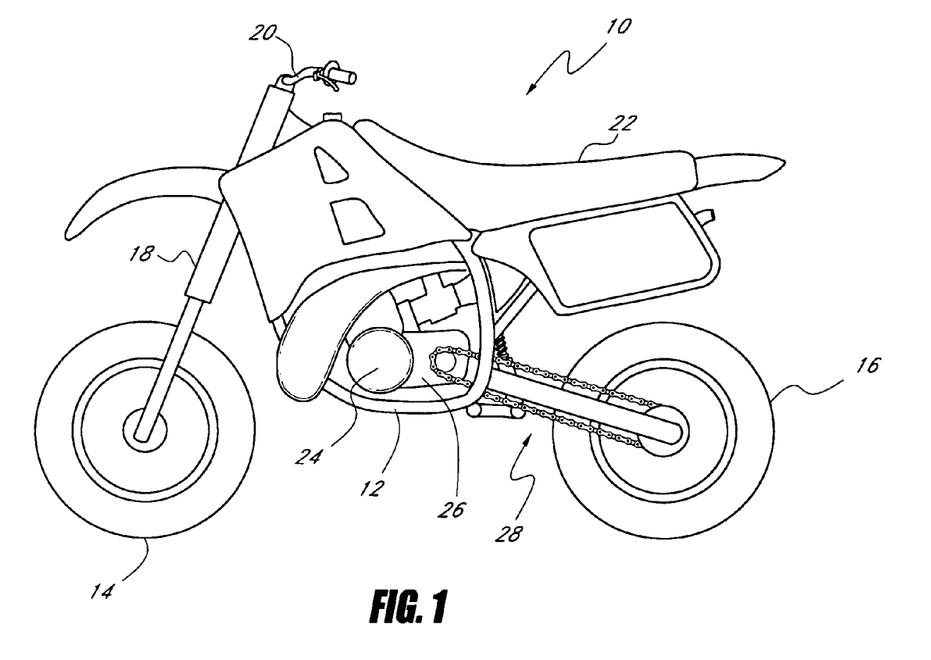
FIG. 1 is a side, elevation view of a motorcycle incorporating a drivetrain having certain features, aspects and advantages of the present invention.

FIG. 1 illustrates an off-road vehicle, and specifically a motorcycle 10. which includes a drivetrain having certain features, aspects and advantages of the present invention. Although the present drivetrain is described herein in connection with an off-road motorcycle 10, preferred embodiments of the drivetrain may be used in, or adapted for use in, other vehicles as well, such as all-terrain vehicles (ATV's), go-carts, snowmobiles, or other engine-driven or similarly powered vehicles.

In addition, as is described in greater detail below, the illustrated motorcycle 10 preferably employs an automatically-engaging primary clutch assembly and a single speed transmission. The motorcycle 10 has an engine of relatively small displacement, such as between about 50 and 125 cubic centimeters, for example, and is intended for relatively young riders, such as between the ages of about 4 and 15, for example. However, the present drivetrain arrangement may also be utilized, or adapted for use in, vehicles having manually-actuated clutch assemblies and/or multi-speed transmissions. In addition, although the present motorcycle 10 is intended for off-road use, the drivetrain arrangement may be adapted for use in vehicles intended primarily for road use as well.

The illustrated motorcycle 10 includes a frame assembly 12 which supports both a front wheel 14 and a rear wheel 16. The front wheel 14 is supported relative to the frame 12 by a front wheel suspension assembly, or a suspension fork 18. A handlebar assembly 20 is mounted to an upper end portion of the fork 18 and permits a rider of the motorcycle 10 to steer the front wheel 14. A straddle-type seat 22 is provided to support a rider of the motorcycle 10 in a seated position.

The frame 12 also supports an engine 24, which is configured to drive at least the rear wheel 16 of the motorcycle 10. The engine 24 is coupled to the rear wheel 16 through a transmission 26 and a chain and sprocket final drive arrangement 28. Although a chain and sprocket final drive 28 is illustrated, the motorcycle 10 may employ other types of final drive assemblies as well, such as belt drive or shaft drive arrangements, for example.

With reference to FIGS. 2-7, a preferred embodiment of a drivetrain or powertrain 30 of the motorcycle 10 is configured to generate torque and deliver the torque to a driven wheel of the motorcycle 10. In the illustrated embodiment, the rear wheel 16 is the driven wheel of the motorcycle 10. However, in other arrangements, the front wheel 14 or the front wheel 14 and the rear wheel 16 may be driven. That is, power may be delivered to either or both of the front and rear wheels 14, 16, as desired. The drivetrain 30 includes the engine 24, transmission 26, and, preferably, additional components as described below.

Figure 2:
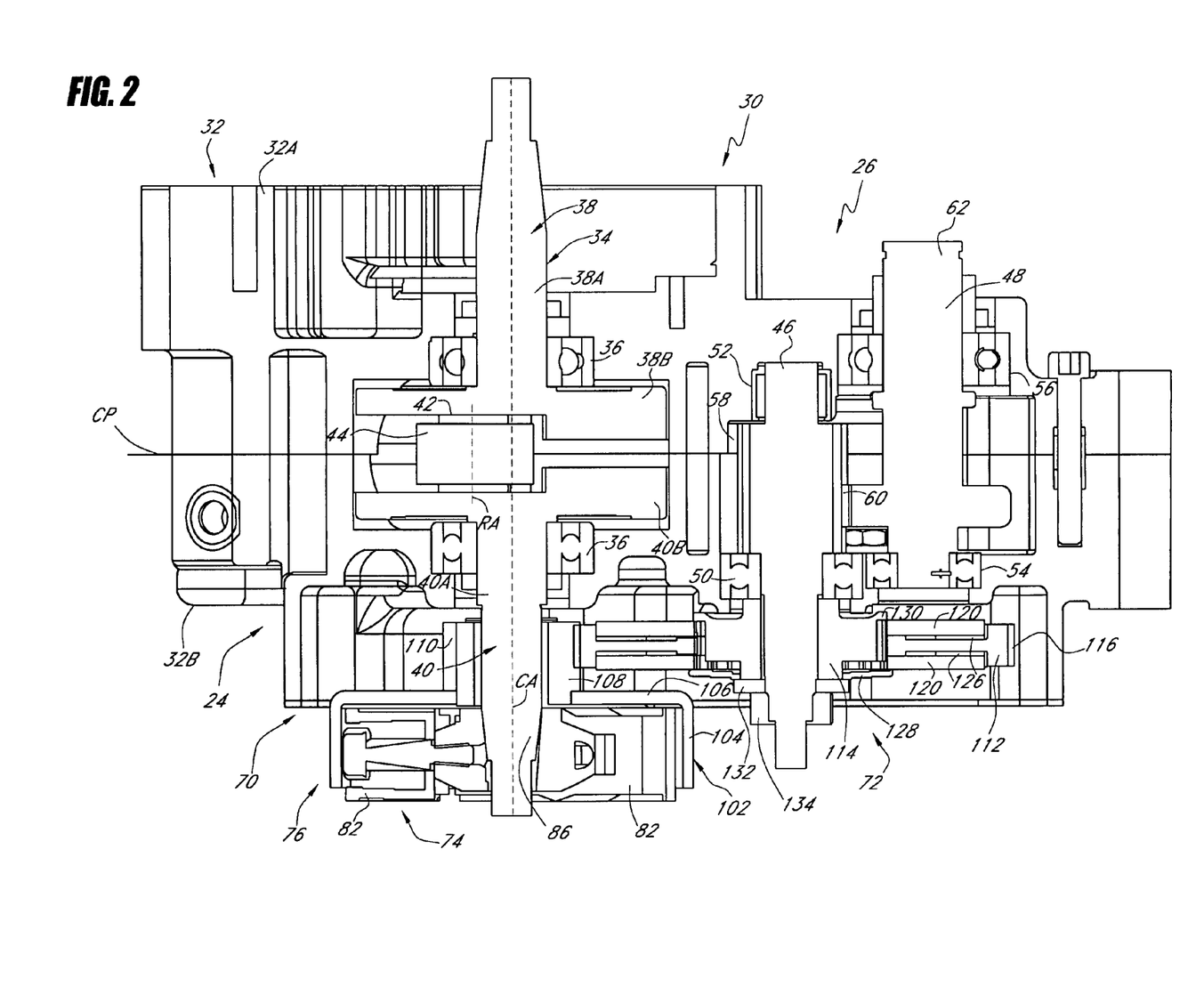
FIG. 2 is a cross-sectional view of an engine and transmission of the motorcycle of FIG. 1.

Preferably, the engine 24 is of a single-cylinder construction and operates on a two-cycle crankcase compression principle. However, other suitable types of engines may also be used, such as four-cycle or rotary engines, for example. In addition, although a single cylinder engine 24 is presently preferred, the engine 24 may be of a multiple cylinder design as well.

In the illustrated arrangement, the engine 24 and transmission 26 are generally housed within and supported by an integral engine case, generally 32, which comprises a right side case member 32A and a left side case member 32B (generally referred to together as the "case" and individually as "cases"). The cases 32A and 32B each include a mating surface, which are configured to contact one another when the two cases 32A and 32B are coupled. The mating surfaces of the cases 32A and 32B preferably lie within a generally vertical, central plane $C_P$ of the engine 24 and transmission 26, with which the wheels 14 and 16 of the motorcycle 10 preferably are also aligned. Although the illustrated engine case 32 supports components of both the engine 24 and the transmission 26, other arrangements are possible in which the engine 24 and transmission 26 employ partially or wholly separate support structures, or cases.

The engine 32 includes a crankshaft assembly 34 rotatably supported by the engine case 32. Desirably, a pair of spaced-apart bearings 36 support the crankshaft assembly 34 for rotation relative to the engine case 32. The crankshaft 34 includes a right-side crankshaft member 38 and a left-side crankshaft member 40. The right crankshaft member 38 includes a shaft portion 38A and a throw 38B. Similarly, the left crankshaft member 40 includes a shaft portion 40A and a throw 40B. The shaft portions 38A, 40A are rotatably supported by the bearings 36.

The right and left crankshaft members 38 and 40 are connected to one another by a connecting member, which preferably is a generally cylindrical pin 42. The pin 42 defines an axis $R_A$, which is offset from the crank axis $C_A$. The pin 42 also rotatably supports a connecting rod 44, which couples a piston (not shown) to the crankshaft 34.

As will be appreciated by one of skill in the art, because the connecting rod axis $F_A$ is offset from the crankshaft axis $C_A$, reciprocal motion of the piston due to combustion within a combustion chamber (not shown) of the engine 24 is transformed into rotary motion of the crankshaft 34. Preferably, a bearing (not shown) is interposed between the crankshaft pin 42 and the connecting rod 44. Because the details of possible piston and cylinder arrangements of the engine 24 are well known to those of skill in the art, additional detailed are not provided herein. Components of the motorcycle 10 in general, and the engine 24 in particular, not described in detail herein may be considered to be of any suitable structure or arrangement.

The transmission 26 is configured to receive a torque input from the engine 24 and pass the torque to the chain and sprocket drive arrangement 28. Preferably, the transmission 26 is has an overall gear reduction ratio, such that the output speed of the transmission 25 is less than the input speed. For any specific application, the transmission 26 may be configured to have a desired overall gear ratio. Moreover, the transmission 26 preferably is configured to provide an output in a desired direction of rotation. Thus, the transmission 26 preferably is adapted for use with a specific engine in order to convert the particular crankshaft rotation direction into a desired output direction of rotation. Accordingly, the transmission 26 may employ any suitable number of individual gears in order to achieve both speed ratio and direction functions.

The illustrated transmission 26 includes a secondary gear 46 and an output gear 48. The secondary gear 46 is supported for rotation relative to the engine case 32 by a first bearing 50 and a second bearing 52, which are spaced apart from one another. The bearing 50 preferably is a ball bearing assembly, including an inner race, an outer race and a plurality of ball bearings separating the races, as shown. In addition, preferably, the bearing 52 is a roller bearing, including a retainer and a plurality of rollers. However, other suitable bearings may also be used for either of the bearings 50 or 52.

The output gear 48 is also rotatably supported relative to the engine case 32 by a first bearing 54 spaced-apart from a second bearing 56. Desirably, each of the bearings 54, 56 are ball bearing assemblies including an inner race, an outer race and a plurality of ball bearings separating the races.

Gear teeth 58 of the secondary gear 46 are in meshed engagement with gear teeth 60 of the output gear 48, such that rotation of the secondary gear 46 results in rotation of the output gear 48. As discussed above, the number of gear teeth 58 and 60 may be varied to achieve a desired gear ratio between the secondary gear 46 and the output gear 48. Furthermore, as also discussed above, additional gears may also be provided in the transmission 26. In other arrangements, the secondary gear 46 may be omitted.

Desirably, an end portion 62 of the output gear 48 protrudes from the engine case 32. The end portion 62 preferably is configured to engage the final drive, or chain and sprocket assembly 28, of the motorcycle 10. Accordingly, the portion 62 of the output gear 48 may be suitably configured to engage a drive sprocket of the chain drive arrangement 28. For example, the end portion 62 may include external gear teeth, or splines, which engage internal gear teeth or splines of the drive sprocket. In addition, alternative arrangements may also be employed.

As described above, preferably the illustrated drivetrain 30 includes a first clutch assembly, or primary clutch 70, and a second clutch assembly, or secondary clutch 72. Preferably, engine-produced torque travels from the crankshaft 34, through the primary clutch 70 and secondary clutch 72 to the secondary gear 46 of the transmission 26. Torque received by the secondary gear 46 is transferred to the output gear 48, which drives the chain and sprocket arrangement 28 and rear wheel 16, as described above. In the illustrated drivetrain 30, the secondary clutch 72 operates as a primary gear of the transmission 26 and, thus, interacts with the secondary gear 46 or the transmission 26. However, in other arrangements, the specific position of the secondary clutch 72 within the drivetrain 30 may be altered.

The terms primary clutch and secondary clutch are used herein as a basis of distinction of the two clutch assemblies from one another. Thus, the terms are merely a convenience and are not intended to describe a particular position of the clutches 70, 72 within the drivetrain 30 and should not be interpreted as such. In that regard, various suitable positions of the clutches 70, 72 within the drivetrain 30 may be utilized to meet particular design criteria, such as optimization of component layout or facilitation of maintenance, for example.

In the illustrated drivetrain 30, the primary clutch 70 is configured to be normally disengaged (at low engine speeds) such that no torque is passed through the clutch assembly 70. Preferably, the primary clutch 70 is configured to move to an engaged position in response to the engine 24 reaching a threshold engagement speed. Specifically, the primary clutch 70 is configured to move from a non-engaged position to an engaged position when the rotating speed of the crankshaft reaches a threshold engagement speed. For example, the threshold engagement speed may be between about 5,000 revolutions per minute (rpm) and 6,000 rpm.

In contrast, the secondary clutch 72 is configured to be normally engaged and moved to a non-engaged, or disengaged position when a torque above a slip threshold is applied to the secondary clutch 72. The desired functions of the primary clutch 70 and the secondary clutch 72 during operation of the motorcycle 10 is described in greater detail below.

The terms "non-engaged" (or "disengaged") and "engaged" are used to describe a general state of the primary clutch 70 or secondary clutch 72. The term "non-engaged" refers to a state in which relative motion between drive and driven portions of the clutch is permitted. As a result, in most cases, little or no torque is transmitted through the clutch. In specific reference to the secondary clutch 72, "non-engaged" may be used to refer to a slip condition of the clutch 72. During a slip condition of the clutch 72, relative movement between drive and driven portions of the clutch 72 is permitted, which reduces the torque passed through the clutch 72, as is described in greater detail below. The term "engaged" refers to a state of the clutch in which motion of one portion of the clutch results in motion of another portion of the clutch. Desirably, in an engaged state, at least some torque will be transmitted through the clutch. However, it is not necessary for drive and driven portions of the clutch to rotate at an identical speed in order to be "engaged."

Figure 3:
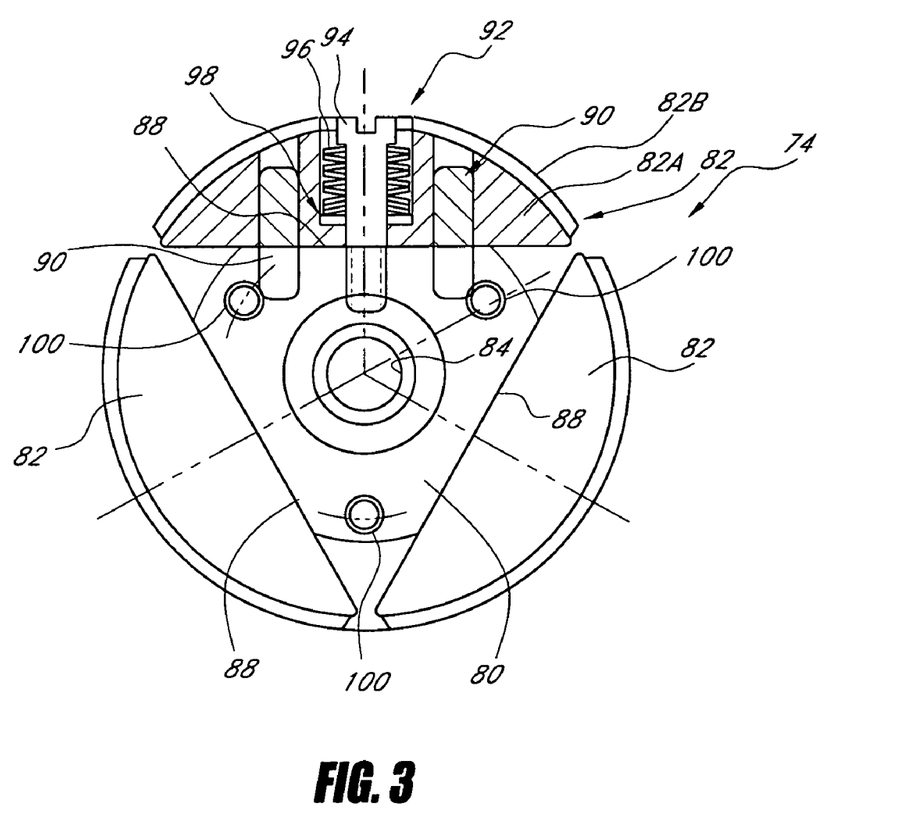
FIG. 3 is a partial cross-sectional view of a component of the primary clutch of FIG. 2.

With reference to FIGS. 2 and 3, the structure of a preferred embodiment of the primary clutch 70 is described in greater detail. Desirably, the clutch 70 includes an input portion 74 and an output portion 76 (or drive and driven portions, respectively). Desirably, the input portion 74 is driven by the engine 24 and, specifically, is coupled for rotation with the crankshaft 34. Preferably, the output portion 76 is coupled for rotation with a portion of the secondary clutch 72. The input portion 74 and the output portion 76 are configured to selectively engage one another such that torque may be transmitted from the input portion 74 to the output portion 76.

Preferably, the input portion 74 of the clutch 70 includes a hub, or arbor 80 and one or more clutch shoes 82. The clutch shoes 82 are movable relative to the arbor 80 from a non-engaged position toward an engaged position. In the illustrated arrangement, three clutch shoes 82 are provided. However, in other arrangements, a greater or lesser number of clutch shoes 82 may be provided.

The arbor 80 preferably is generally triangular in shape and includes a central bore 84. In the illustrated arrangement, the bore 84 is tapered and configured to be supported by a tapered portion 86 of the left crankshaft member 40. The arbor 80 and crankshaft member 40 are configured for an interference fit, such that the arbor 80 is fixed for rotation with the crankshaft member 40. However, in other arrangements, the arbor 80 and the crankshaft member 40 may be coupled in any other suitable manner, such as a splined connection, for example.

The arbor 80 also defines three generally planar side surfaces 88. Preferably, each one of the clutch shoes 82 abuts one of the planar surfaces 88 at a rest position of the clutch shoe 82. In addition, as discussed above, each of the shoes 82 is movable in a radial direction away from the arbor 80 toward an engaged position.

In the illustrated arrangement, each shoe 82 is supported by a pair of guide pins 90, which permit the shoe 82 to slide along the guide pins 90. The pair of guide pins 90 advantageously restricts movement of the shoe 82 to a generally radial direction (relative to an axis of the bore 84) and fixes the clutch shoe 82 for rotation with the arbor 80. Thus, preferably, the pins 90 are configured to withstand the relevant torsional loads between the arbor 80 and clutch shoes 82. Furthermore, other suitable coupling arrangements between the arbor 80 and clutch shoes 82 may also be used.

The input portion 74 of the clutch assembly 70 also includes a biasing arrangement 92 configured to generate a force resisting radially outward movement of the clutch shoes 82. Preferably, the biasing arrangement 92 is configured such that the shoes 82 move outwardly to contact the driven portion 96 of the clutch 70 only once a desired threshold engine speed has been reached, and remain in contact with the driven portion 96 so long as the engine speed is maintained above the threshold. Furthermore, the biasing arrangement 92 may be adjustable such that the engine speed at engagement of the clutch 70 may be adjusted.

The illustrated biasing arrangement includes a bolt 94 coupled to the arbor 80. One or more springs 96 surround a shaft portion of the bolt 94. In the illustrated arrangement, a plurality of spring washers, or Belleville washers, are provided in a stacked arrangement. A first end of the washer stack 96 contacts the head of the bolt 94 and the second end of the stack of washers 96 acts on the clutch shoe 82. If desired, a wear member, such as washer 98, may be interposed between the stack of springs 96 and the clutch shoe 82 to reduce the wearer of the clutch shoe 82 due to cycling of the springs 96.

The illustrated arrangement of washers 96 includes nine spring washers, with six of the washers 96 being arranged in pairs positioned opposite one another such that contact between adjacent washers 96 occurs at alternating outside edges and inside edges of the washers 96. The remaining three of the washers 96 are stacked on top of one another such that the washers contact one another generally over one entire surface. The stacked washers 96 are positioned adjacent the clutch shoe 82. Although such an arrangement is preferred, other suitable arrangements of the washer stacks 96 may also be used. In addition, alternative biasing arrangements may be provided, such as coil springs or the like.

The clutch arbor 80 also includes three threaded apertures 100 spaced at intervals from one another and extending generally parallel to the axis of the bore 84. Preferably, the apertures 100 are spaced at 180° intervals. Together, the apertures 100 may be engaged by a clutch puller tool (not shown), which is configured to assist in removing the input portion 74 of the clutch 70 from the crankshaft 34.

Desirably, each of the clutch shoes 82 includes a body portion 82a and friction material portion 82b. In the illustrated arrangement, the body portion 82a is made of a metal material, such as aluminum, for example. Desirably, the friction material portion 82b is constructed from a woven material, which is intended to be used in wet-clutch application. That is, preferably, the clutch 70 is immersed in a lubricating fluid. However, in other arrangements, the clutch 70 may be a dry-clutch, wherein no lubricating fluid is provided.

The output portion 76 of the clutch 70 preferably is a clutch basket, or drum 102. The illustrated clutch drum 102 has a cylindrical wall portion 104, an inner surface of which is configured to contact the friction material 82b of the clutch shoes 82 when the shoes 82 move radially outward relative to the arbor 80 to a sufficient extent.

The clutch drum 102 also includes a radial wall 106 which connects the wall 104 with a hub 108 of the drum 102. The hub 108 is supported by the left crankshaft member 40 and is configured to freely rotate upon the left crankshaft member 40. The hub 108 also includes external splines or gear teeth 110, which permit the clutch drum 102 to engage the secondary clutch 72, as is described below. Thus, the output portion 76 of the primary clutch 70 functions as input to the secondary clutch 72.

With reference to FIG. 2, the illustrated secondary clutch 72 is an assembly of multiple components including a gear 112 and a hub 114. The gear 112 includes external gear teeth 116 which engage with gear teeth 110 of the primary clutch hub 108. Accordingly, rotation of the clutch drum 102 results in rotation of the gear 112. Furthermore, the gear 112 includes a central bore 117, which is configured to permit the gear 112 to rotate relatively freely on the outside diameter of the hub 114.

The hub 114 is fixed for rotation with the secondary gear 46. Specifically, in the illustrated arrangement, the hub 114 includes a plurality of internal teeth, or splines 118, which mate with splines (not shown) on the secondary gear 46. Accordingly, rotation of the hub 114 results in rotation of the secondary gear 46. In this manner, the hub 114 operates as an output of the secondary clutch 72.

The secondary clutch 72 is configured for operation in two states, or two modes, as described above. In a first mode, the hub 114 of the secondary clutch 72 is engaged, or coupled for movement with the gear 112, such that torque is passed through the secondary clutch 72 to the secondary gear 46. In a second mode, the hub 114 is disengaged from the gear 112 and relative movement between the hub 114 and the gear 112 is permitted such that the passage of torque through the secondary clutch 72 is reduced or eliminated.

Figure 5:
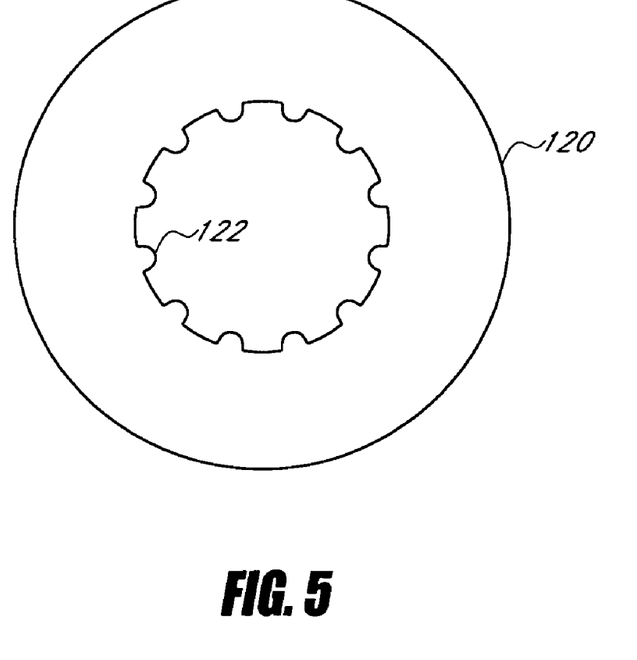
FIG. 5 is a plan view of a pressure plate of the secondary clutch of FIG. 2.

In the illustrated arrangement, the secondary clutch 72 includes a pair of pressure plates 120 coupled for rotation with the hub 114. The provision of two pressure plates 120 increases the surface area available to frictionally engage the gear 112 to transmit torque therebetween. Thus, in other applications, a greater or lesser number of pressure plates 120 may be provided, depending on the dimensional restraints imposed and/or the expected torque levels involved.

Specifically, the pressure plates 120 include a plurality of internal gear teeth 122 which mesh elongate gear teeth, or splines 124, of the hub 114. Desirably, the pressure plates 120 are also configured for limited axial movement along the hub 114 by sliding on the splines 124, as is described in greater detail below. However, other suitable arrangements to fix the pressure plate 120 for rotation with the hub 114 while permitting at least limited axial movement therebetween may also be used.

Figure 7:
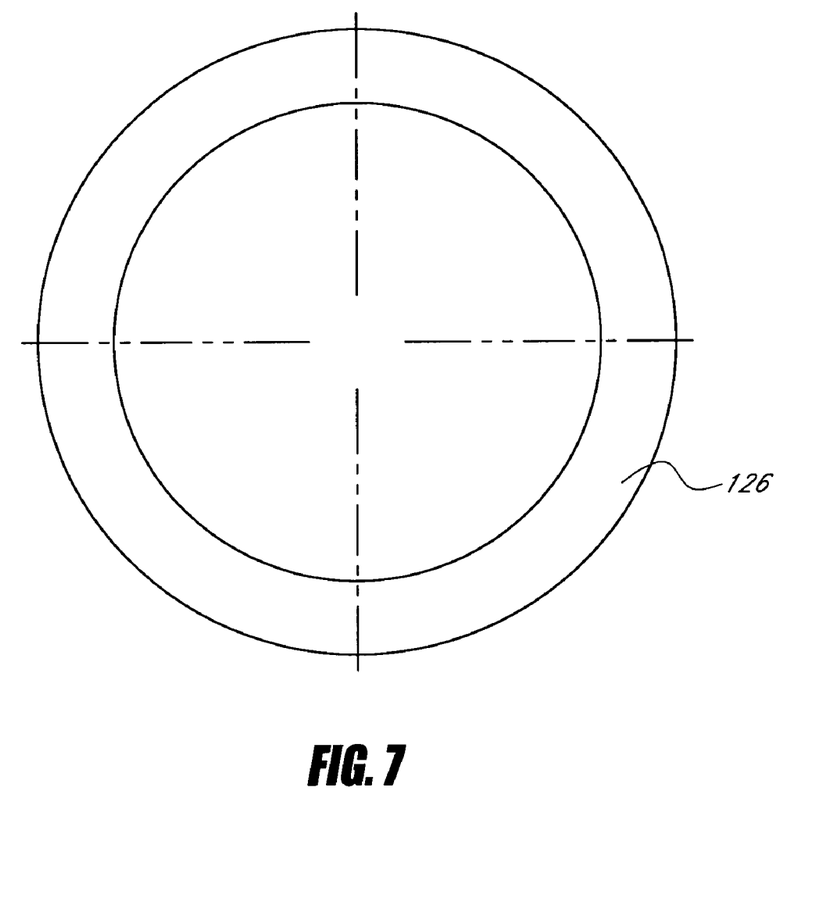
FIG. 7 is a plan view of a friction member of the secondary clutch assembly of FIG. 2.

Preferably, friction members 126 are interposed between the pressure plates 120 and the gear 112. The friction members 126 are configured to facilitate frictional engagement of the pressure plates 120 and the gear 112. In the illustrated arrangement, the friction members 126 are paper-type, thin annular rings of friction material that are loosely received between the pressure plates 120 and the gear 112. Furthermore, the illustrated secondary clutch 72 is configured to have an overall coefficient of friction of about 0.1. However, in other arrangements or applications, the coefficient may vary.

Figure 4A:
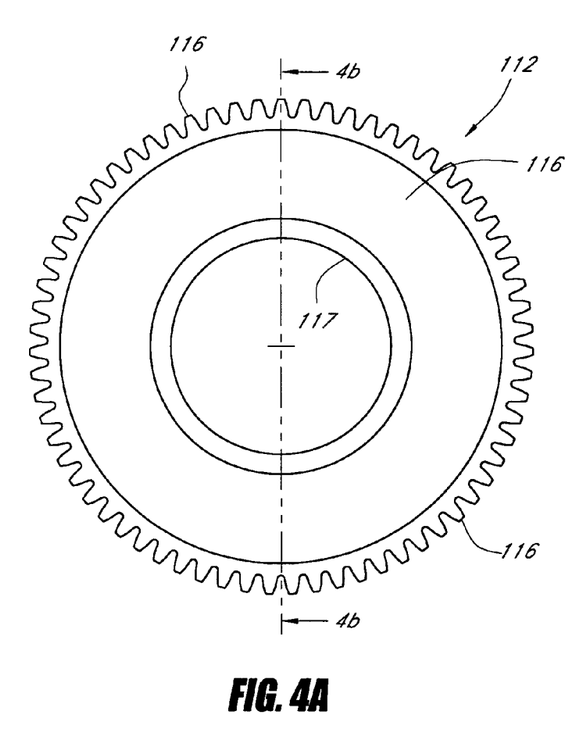
FIG. 4A is a plan view of the gear.
Figure 4B:
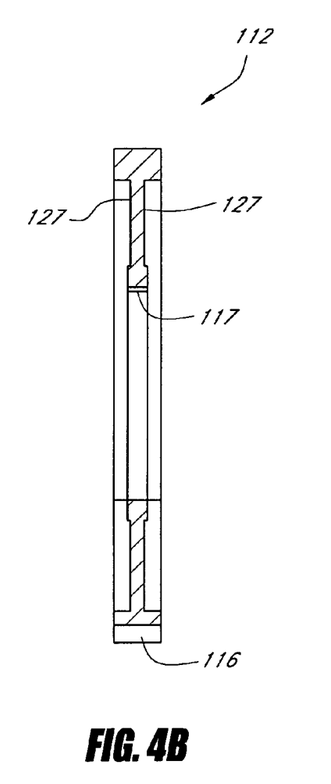
FIG. 4B is a cross-sectional view of the gear taken along the line 4B-4B of FIG. 4A.

With reference to FIGS. 4a and 4b, preferably, the gear 112 includes a pair of recesses 127 on each side, which are sized and shaped to accommodate the friction members 126. Furthermore, the entire central portion of the gear 112 defines is recessed on each side with respect to the width of the gear teeth 116. Accordingly, the assembly of the pressure plates 120, friction members 126 and gear 112 advantageously is relatively compact in a direction along the axis of rotation of the secondary clutch 72. Such an arrangement permits the secondary clutch 72 to be easily accommodated within the confines of the engine case 32.

Preferably, the friction members 126 are of a similar construction to those utilized in automotive transmission lock-up damper applications. However, other suitable types and/or shapes of friction members may also be used. Furthermore, although the present friction members 126 are loosely received between the pressure plates 120 and the gear 112, in other arrangements the friction members 126 may be secured to one or the other of the pressure plates 120 or gear 112, such as with an adhesive bond, for example.

Preferably, a biasing member 128 is provided and configured to apply a biasing force tending to squeeze the pressure plates 120 together with the gear 112. In the illustrated arrangement, the biasing member 128 is a disc-type spring. The biasing member 128 is configured, in light of the specific coefficient of friction of the secondary clutch 72, to produce a suitable biasing force to maintain the pressure plates 120 and gear 112 in frictional engagement at torque inputs up to a desired slip torque. In the illustrated arrangement, the biasing force produced by the biasing member 128 in the engaged position of the secondary clutch 72 is about 1000 pounds. However, in other arrangements or applications, the biasing force may vary. Furthermore, other suitable biasing members may also be used, such as other types of springs, for example.

In the illustrated arrangement, the hub 114 includes a shoulder 130 (FIG. 6c), which is positioned adjacent one end of the splines 124 and defines a stop for one of the pressure plates 120. Specifically, the shoulder 130 defines an innermost (i.e., toward the central plane $C_P$) axial position of the inner pressure plate 120 relative to the hub 114. Thus, the biasing member 128 squeezes the gear 112 and outer pressure plate 120 toward the inner pressure plate 120, which rests against the shoulder 130.

Preferably, a washer 132 abuts the hub 114 and, desirably, contacts an inner portion of the biasing member 128 to retain the biasing member in contact with the outermost pressure plate 120. In the illustrated arrangement, the entire assembly is secured to the secondary gear 46 by a nut 134. However, in other arrangements, other suitable mechanisms for securing the secondary clutch 72 to the secondary gear 46 may also be used.

Desirably, both the primary clutch 70 and the secondary clutch 72 are contained within a lubricant bath of lubricating or heat-dissipating fluid. Specifically, a cover (not shown) preferably covers the primary clutch 70 and secondary clutch 72 and is coupled to the engine case 32b. Any suitable type of lubricating fluid may be used, such as an automatic transmission fluid, for example.

Figure 6A:
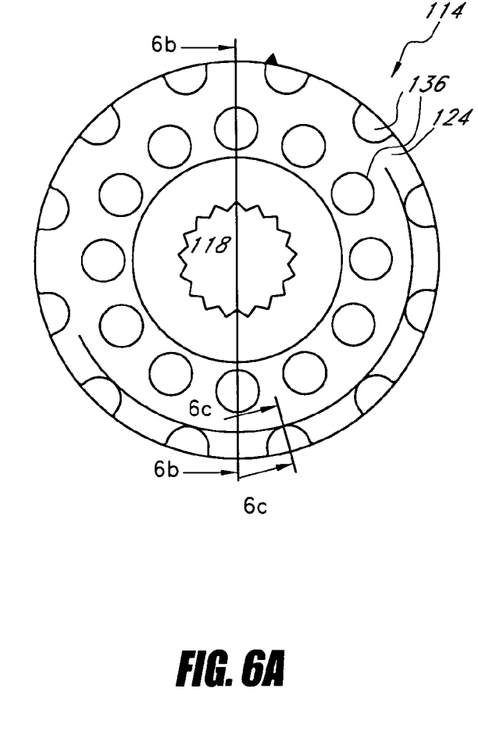
FIG. 6A is a plan view of the hub.
Figure 6B:
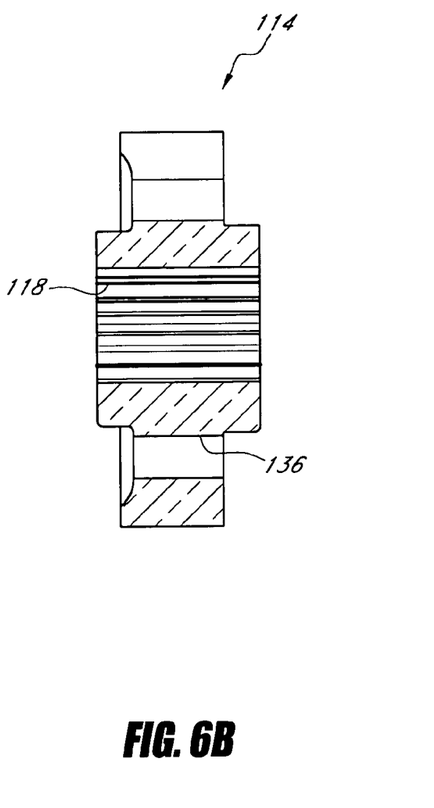
FIG. 6B is a cross-sectional view of the hub taken along view line 6B-6B of FIG. 6A.
Figure 6C:
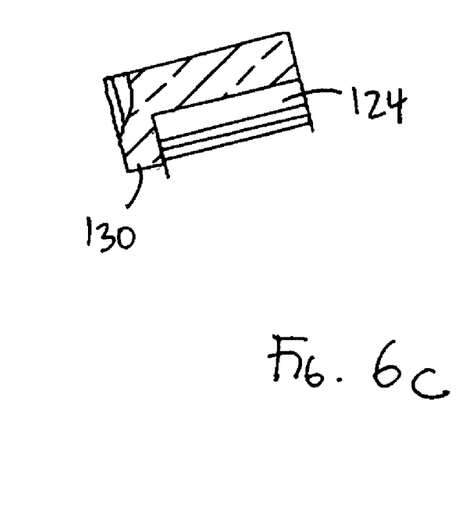
FIG. 6C is a cross-sectional view of a portion of the hub and is taken along view line 6C-6C of FIG. 6A.

Desirably, the hub 114 of the secondary clutch 72 includes a plurality of apertures 136, which extend in an axial direction through the hub 114. Advantageously, the apertures 136 permit fluid to move from an outside of the hub 114 toward an inside the hub 114 to lubricate the bearing 50, as well as the secondary gear 46, and output gear 48. In the illustrated arrangement, twelve apertures 136 are provided. However, in other arrangements, a greater or lesser number of apertures 136 may be provided.

In operation, a rider of the motorcycle 10 operates a throttle assembly to increase the speed of the engine 24, as is well-known in the art. Once the speed of the engine 24 reaches a threshold engagement speed, the clutch shoes 82 of the primary clutch 70 move outwardly to contact the primary clutch drum 102. A frictional force between the clutch shoes 82 and clutch drum 102 causes the clutch to rotate with the input portion 74 of the primary clutch 70. At lower engine speeds, even though contact between the clutch shoes 82 and clutch drum 102 occurs, the clutch drum 102 may rotate at a speed that is slower than the rotation of the input portion 74 of the primary clutch 70. At higher engine speeds, lockup of the primary clutch 70 may occur, wherein the input portion 74 and output portion 76 rotate at or near a common speed.

Rotation of the output portion 76 of the primary clutch 70 results in rotation of the gear 112 of the secondary clutch 72 due to the engagement of the teeth 110 of the hub 108 and the teeth 116 of the gear 112. When the torque acting on the secondary clutch 72 is below a threshold torque, the pressure plates 120 remain frictionally engaged with the gear 112, through the friction members 126, such that rotation of the gear 112 results in rotation of the pressure plates 120.

Desirably, the gear 112, and pressure plates 120 rotate at a common speed at torques below the threshold torque level. Furthermore, preferably, the threshold slip torque, below which the gear 112 and pressure plates 120 remain frictionally engaged, is related to a maximum torque of the engine 24. Desirably, the threshold torque of the secondary clutch 72 is greater than a maximum torque that can be produced by the engine 24. In some arrangements, the threshold torque of the secondary clutch 72 may be significantly greater than the maximum of the engine 24, such as one and one-half or two times as great as the maximum engine torque. Such an arrangement reduces or eliminates the occurrence of slippage of the secondary clutch 72 due to engine produced torque.

As described above, the pressure plates 120 are coupled for rotation with the hub 114 such that at torque levels below the threshold slip torque, the hub 114 rotates with the pressure plates 120, which are frictionally engaged with the gear 112. The hub 114 rotates the secondary gear 46 which, in turn, rotates the output gear 48. The output gear 48 drives the chain drive 28 of the motorcycle 10 and powers the rear wheel 16.

As described above, torques may be introduced to the drivetrain 30 by external forces. For example, when the rear wheel 16 of the motorcycle 10 is airborne and rotating at a high rate of speed, it is slowed suddenly and dramatically upon striking the ground. This sudden slowing of the rear wheel 16 introduces a torque spike that is transmitted through the chain drive 28 and into the transmission 26. The torque spike travels through the output gear 48 and secondary gear 46 to the clutch hub 114 and pressure plates 120. If the torque spike is above the threshold slip torque of the secondary clutch 72, the frictional engagement between the pressure plates 120 and the gear 112 is overcome such that relative movement between the pressure plates 120 and gear 112 is permitted. Such relative motion attenuates the torque spike and inhibits or prevents the occurrence of damage to the components of the drivetrain 30. Once the torque level falls below the threshold torque of the secondary clutch 72, the pressure plates 120 and gear 112 once again engage such that engine-produced torque may be transferred through the drivetrain 30 and delivered to the rear wheel 16.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. For example, as noted above, the drivetrain may be adapted for use in other types of vehicles, both off-road and on. Furthermore, the drivetrain may utilize an automatic primary clutch or a manual primary clutch. The transmission may be a single speed (a fixed gear ratio) or may be a multi-speed transmission.

As discussed above, the secondary clutch may take on any number of alternative, suitable arrangements and still be operable for its intended purpose. Furthermore, although the illustrated position of the secondary clutch within the drivetrain is presently preferred, many locations of the secondary clutch are possible. Desirably, the secondary clutch is positioned between the output shaft of the engine and the final drive chain and sprocket assembly. However, in other arrangements, the secondary clutch may be positioned further downstream from the engine within the drivetrain, such as at or near the rear wheel, for example.

Thus, while the present drivetrain has been described in the context of particularly preferred embodiments, the skilled artisan will appreciate, in view of the present disclosure, that certain advantages, features, and aspects of the drivetrain may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A single-speed off-road vehicle, comprising:
an engine;
at least one driven wheel;
a transmission configured to selectively transfer torque from said engine to said driven wheel at a constant ratio, said transmission comprising:
a first clutch driven by said engine and configured to automatically engage at engine speeds above a threshold engine speed such that torque is transmitted through said first clutch; and
a second clutch configured to be normally engaged such that torque is passed through said second clutch and further configured to disengage when a torque is applied to said second clutch that is above a threshold slip torque.

2. The vehicle of claim 1, wherein said second clutch comprises an input portion, an output portion and a biasing member configured to bias said input portion and said output portion into engagement with one another.

3. The vehicle of claim 2, wherein said input portion is driven directly by said first clutch.

4. The vehicle of claim 2, wherein said biasing member is configured to generate a biasing force sufficient to produce a frictional force between said input portion and said output portion of at least about 1.5 times a maximum torque producible by said engine.

5. The vehicle of claim 2, wherein said input portion comprises a drive plate and said output portion comprises a first driven plate and a second driven plate coupled for rotation with a hub.

6. The vehicle of claim 5, wherein said drive plate is straddled by said first driven plate and said second driven plate, said biasing member is configured to apply a biasing force to said second clutch to frictionally engage said drive plate with said first and second driven plates.

7. The vehicle of claim 6, additionally comprising a first friction member positioned between said drive plate and said first driven plate and a second friction member positioned between said drive plate and said second driven plate.

8. The vehicle of claim 7, wherein said first and second friction members are loosely positioned between said drive plate and said first and second driven plates, respectively.

9. The vehicle of claim 1, wherein said second clutch is positioned within a fluid chamber.

10. A single-speed off-road vehicle, comprising:
an engine;
at least one driven wheel;
a transmission configured to selectively transfer torque from said engine to said driven wheel at a constant ratio, said transmission comprising:
a first clutch driven by said engine and configured to automatically engage at engine speeds above a threshold engine speed such that torque is transmitted through said first clutch; and
means for operably disengaging said engine from said driven wheel in response to a torque input to said transmission above a threshold torque when said engine speed is above said threshold engine speed.

11. The vehicle of claim 10, wherein said threshold torque is greater than a maximum torque producible by said engine.

* * * * *